2 Sheets--Sheet 1.

B. OWEN.

Horse Hay-Rake.

No. 6,304.

Reissued Feb. 23, 1875.

Attest:

W. H. Clark

B Pickering

Inventor:

Benjamin Owen

THE GRAPHIC CO. PHOTO-LITH. 39 & 41 PARK PLACE, N.Y.

2 Sheets--Sheet 2.

B. OWEN.

Horse Hay-Rake.

No. 6,304. Reissued Feb. 23, 1875.

Attest:

W. H. Clark

B. Pickering

Inventor:

Benjamin Owen

THE GRAPHIC CO. PHOTO-LITH. 39 & 41 PARK PLACE, N.Y.

UNITED STATES PATENT OFFICE.

BENJAMIN OWEN, OF DAYTON, OHIO.

IMPROVEMENT IN HORSE HAY-RAKES.

Specification forming part of Letters Patent No. 155,967, dated October 13, 1874; reissue No. 6,301, dated February 23, 1875; application filed November 16, 1874.

*To all whom it may concern:*

Be it known that I, BENJAMIN OWEN, of Dayton, in the county of Montgomery and State of Ohio, have invented certain Improvements in Horse Hay-Rakes; and I do hereby declare that the following is a full, clear, and exact description thereof, reference being had to the accompanying drawings making a part of this specification, in which—

Figure 1:
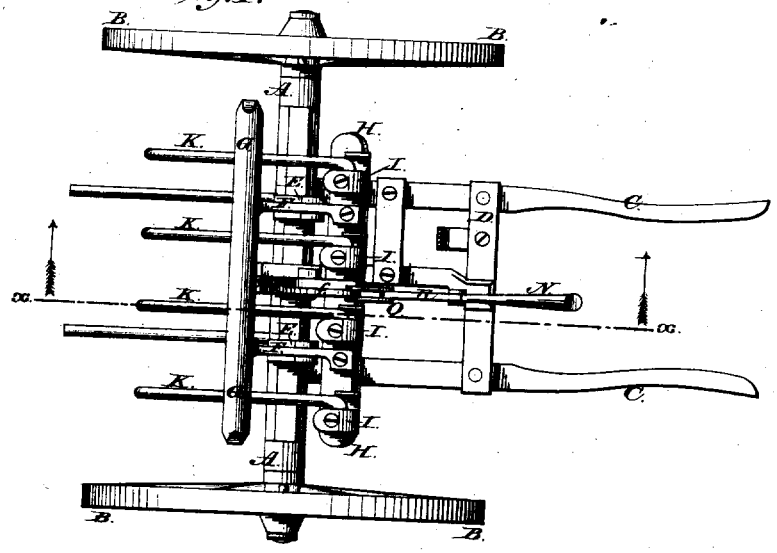
Figure 2:
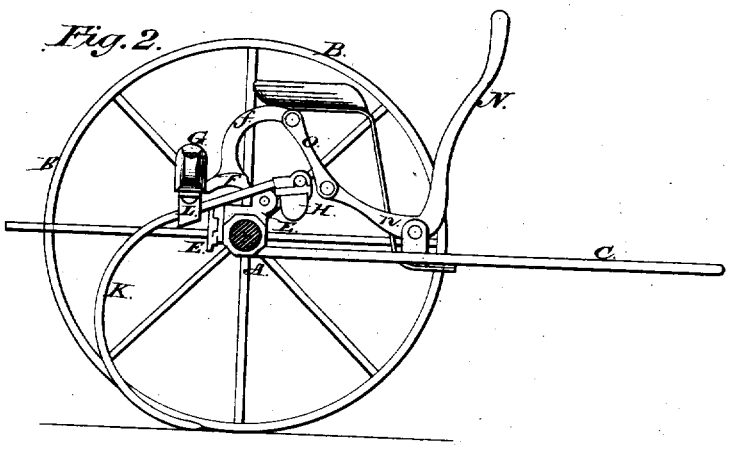
Figure 3:
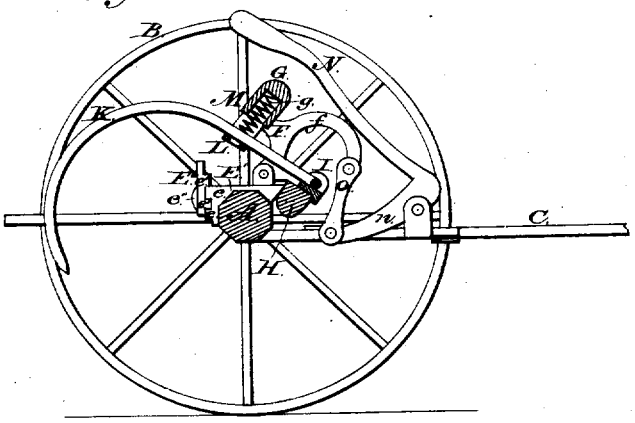
Figure 5:
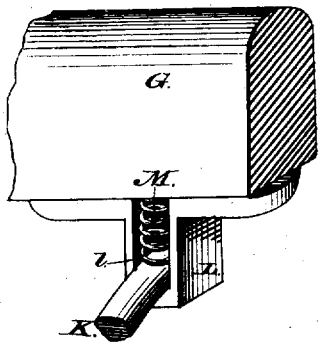
Figure 4:
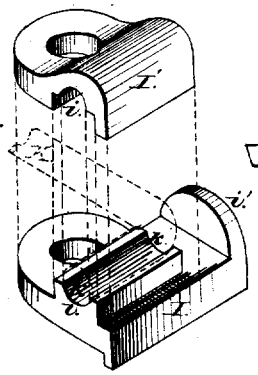
Figure 6:
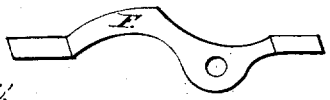

Figure 1 is a plan view of the upper side of my improved apparatus. Fig. 2 is a side elevation of the same, the ground-wheel upon the nearest side being removed. Fig. 3 is a vertical section upon line *x x* of Fig. 1. Fig. 4 is an enlarged perspective view of the holder or pivoted bearing for the forward end of a rake-tooth. Fig. 5 is a like view of one of the guides for insuring the lateral and vertical position of a tooth with relation to the other teeth; and Fig. 6 is a side elevation of one of the bars employed for connecting together the rake-head and pressure-bar, and which furnishes a pivotal bearing for the rake.

Letters of like name and kind refer to like parts in each of the figures.

The design of my invention is to increase the efficiency and ease with which a horse hay-rake is operated; and it consists, principally, in the construction of the pivotal bearing for and its combination with the forward end of a rake-tooth, substantially as and for the purpose hereinafter shown. It consists, further, in the means employed for insuring and varying the vertical position of the lower ends of the rake-teeth with relation to the surface of the ground, and also in guiding the tooth laterally, and holding it flexibly in its vertical movement by a spring inclosed in the pressure-bar, and a hollow guide for covering an orifice therein for the spring.

In the annexed drawings, A represents an axle, having journaled upon its ends two ground-wheels, B and B, and secured to or upon its lower side the rear end of two shafts, C and C, which latter extend forward, and at a suitable distance from said axle are connected together by means of a cross-bar, D. At three or more points upon the upper side of the axle A are attached bearing-blocks E and E, within each of which is pivoted a metal bar, F, that has the form shown in Fig. 6, and at its rear end is secured to or upon the lower side of a wooden bar, G, and at its opposite or front end is attached to or upon the upper side of a second wooden bar, H, said metal bars F and F being arranged to rock within their bearings and move said connecting-bars G and H. At suitable points upon the upper side of the forward bar or head H are secured a number of bearing-blocks, I and I, each of which is provided with a cap, I′, that is held in place by the screw employed for attaching said block to the said head. Between the block I and its cap I′ is formed a round bearing, *i*, that corresponds to and receives the forward bent end *k* of a rake-tooth, K, which tooth from said bearing extends rearward, and is confined in lateral position by means of a lug, *i′*, that is formed upon the end of said block, such attachment permitting said tooth to move freely in a vertical direction, within certain limits, upon the head H. From the head H each rake-tooth K extends rearward beneath the bar G, and through a vertical slot, *l*, which is formed in a metal hollow guide, L, that is attached to or upon the lower side of said bar, and from thence extends rearward, downward, and forward in a curve, in the usual manner. The length of the slot *l*, within each guide L, is sufficient to give to the tooth contained therein all necessary independent motion with relation to the other teeth, while a spiral spring, M, contained principally within a circular cavity, *g*, immediately over said slot, bears upon the upper side of said tooth, and presses the same downward against the lower end of the latter. This arrangement of the teeth insures the general uniformity of their positions, and affords to each a sure and sufficient support without interfering with such independent vertical motion as is necessary in order to enable said teeth to conform to the inequalities of the ground. In order that the vertical position of the rake-teeth may be varied at will, the rear end of the center bearing-block E′ is provided with horizontal teeth or serrations *e*, and upon or against such end is fitted a plate, E″, the contiguous face of which is provided with corresponding teeth *e′*, so that when said parts are held together by means of a screw, *e″*, that passes horizontally inward from the rear, said serrations or teeth will engage and insure the vertical position of said plate. The screw-opening within the plate E″ is lengthened vertically, so as to enable said plate to be removed in a like direction whenever the screw is loosened sufficiently to enable the engaging toothed surfaces to be separated. The upper end of the plate thus constructed and adjusted receives the lower side of the pressure-bar G, and forms a bearing for and upon which the same rests. The rake is dumped by means of a lever, N, that has the shape shown in Figs. 2 and 3, is pivoted upon the cross-bar D, and is connected to or with an arm, *f*, that extends in a curve upward and forward from the center bar F, by means of a bar, O, which, at its end, is pivoted upon and extends between said arm *f* and a rearward-projecting arm, *n*, of said lever. By moving rearward the upper end of the lever N the rake-head will be depressed, and the pressure-bar and rake-teeth raised to the position shown in Fig. 3, while an opposite movement of said lever will cause said parts to resume their former position. By curving rearward the central portion of the lever N, it is caused to strike against the arm *f* and arrest its motion, such construction of parts, by limiting the rearward motion of said lever, preventing all accidental contact between the hand of the operator and the rake-teeth.

What I claim as my invention is—

1. The pivoted bearing, formed in two sections, I and I′, provided with the opening *i* and lug *i′*, and combined with bent end *k* of the rake-tooth K, substantially as and for the purposes shown.

2. In combination with the pressure-bar G of the pivoted rake, the block E and plate E′, provided upon their contiguous faces with teeth or serrations *e* and *e′*, and combined by means of the screw *e″*, substantially as and for the purpose shown and described.

3. The arrangement of the hollow guide L on the under side of the bar G, near its center, and covering an orifice therein for the spring M, substantially as set forth.

BENJAMIN OWEN.

Witnesses:
W. H. CLARK,
B. PICKERING.